US012109723B2

(12) United States Patent
Sherman

(10) Patent No.: US 12,109,723 B2
(45) Date of Patent: Oct. 8, 2024

(54) METHOD AND APPARATUS FOR USING A MITER GAUGE

(71) Applicant: Woodpeckers, LLC, Strongsville, OH (US)

(72) Inventor: Wayne Sherman, Hinckley, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 0 days.

(21) Appl. No.: 17/581,448

(22) Filed: Jan. 21, 2022

(65) Prior Publication Data

US 2023/0234257 A1 Jul. 27, 2023

(51) Int. Cl.
*B27B 27/10* (2006.01)
*B27B 27/02* (2006.01)

(52) U.S. Cl.
CPC .............. *B27B 27/10* (2013.01); *B27B 27/02* (2013.01)

(58) Field of Classification Search
CPC .... B27B 27/00; B27B 27/02-08; B27B 27/10
USPC .......................................... 83/435.11-435.13
See application file for complete search history.

(56) References Cited

U.S. PATENT DOCUMENTS 1,026,475 A * 5/1912 Tarbuck .................. B25B 5/006 269/93
2,412,870 A * 12/1946 Champlin ................ G01B 3/20 33/DIG. 1
2,879,059 A * 3/1959 Sandefur .................. B25H 1/00 269/84
2,913,019 A 11/1959 Sprague
D231,663 S 5/1974 Pingel
3,810,311 A * 5/1974 Pingel .................. B23Q 16/001 33/613
3,827,686 A * 8/1974 Storkh .................. B25B 1/2468 248/286.1
3,961,557 A 6/1976 Jezowski
4,030,718 A * 6/1977 Philipoff .............. B23Q 16/001 269/315
4,237,759 A * 12/1980 Jones ..................... B26D 3/225 83/591
4,275,872 A * 6/1981 Mullis .................. B23Q 16/001 269/72
4,343,092 A * 8/1982 Wahl .................... G01B 5/0002 33/834
4,598,480 A * 7/1986 Cukelj ................. B23Q 16/001 33/833

(Continued)

OTHER PUBLICATIONS

"75 Type Miter Track Stop", Aug. 10, 2020, Amazon.com, site visited Aug. 12, 2323; https://www.amazon.com/T-Track-Woodworking-Limiter-Aluminum-T-Slot-Stop/dp/B08FHZWGGS (Year 2020).

(Continued)

*Primary Examiner* — Adam J Eiseman
*Assistant Examiner* — Richard D Crosby, Jr.
(74) *Attorney, Agent, or Firm* — Sand, Sebolt & Wernow Co., LPA

(57) ABSTRACT

A rotation stop assembly that is operable to engage a rail assembly of a miter gauge to support the miter gauge and prevent rotational movement thereof when the gauge is extended beyond the edge of a work surface. The rotation stop assembly may utilize the piece of material being cut to further support the gauge and prevent rotational movement thereof.

15 Claims, 8 Drawing Sheets

(56) References Cited

U.S. PATENT DOCUMENTS

| | | | | | |
|---|---|---|---|---|---|
| 4,693,158 | A * | 9/1987 | Price | B23Q 16/001 144/287 |
| 4,962,918 | A * | 10/1990 | Yang | B25B 5/101 269/208 |
| 4,986,323 | A * | 1/1991 | Lemaire, Jr. | B27B 27/02 33/813 |
| 5,038,486 | A * | 8/1991 | Ducate, Sr. | B27B 29/00 83/435.14 |
| 5,152,070 | A * | 10/1992 | Sorokes | G01B 5/004 33/503 |
| 5,181,702 | A * | 1/1993 | Pettigrew | B25B 5/003 269/95 |
| 5,197,721 | A * | 3/1993 | Ruberg | B23Q 16/001 269/315 |
| 5,337,641 | A * | 8/1994 | Duginske | B27B 27/02 33/468 |
| 5,579,672 | A * | 12/1996 | Findlay | B27B 27/04 83/522.11 |
| 5,617,909 | A * | 4/1997 | Duginske | B27B 27/10 403/381 |
| 5,768,966 | A * | 6/1998 | Duginske | B27B 25/10 144/253.1 |
| 5,845,555 | A * | 12/1998 | Dawley | B23Q 16/006 83/467.1 |
| 5,895,184 | A * | 4/1999 | Walters | B23Q 16/001 33/642 |
| 5,996,986 | A * | 12/1999 | Ewing | B25B 1/2468 269/282 |
| 6,557,601 | B1 * | 5/2003 | Taylor | B27B 27/10 83/435.14 |
| 6,860,475 | B2 * | 3/2005 | Wong | B25B 5/142 269/43 |
| 6,880,442 | B2 * | 4/2005 | Duginske | B27F 5/02 144/253.1 |
| 6,889,968 | B1 * | 5/2005 | Wong | B23Q 3/069 269/95 |
| 7,000,519 | B1 * | 2/2006 | Weinstein | B25B 5/101 83/437.1 |
| 7,107,699 | B2 | 9/2006 | Chang | |
| 7,114,714 | B2 * | 10/2006 | Wong | B25B 5/147 269/45 |
| 7,127,976 | B1 * | 10/2006 | Fitzsimmons | B23D 55/046 83/437.1 |
| D535,671 | S * | 1/2007 | Bernhardt | D15/140 |
| 7,360,567 | B2 | 4/2008 | Gregoire | |
| D578,145 | S * | 10/2008 | Bernhardt | D15/140 |
| 7,798,187 | B1 * | 9/2010 | Duginske | B27B 27/10 144/253.1 |
| 7,938,379 | B2 | 5/2011 | Baten | |
| 8,220,374 | B2 * | 7/2012 | Wang | B27B 27/10 83/435.15 |
| D677,141 | S | 3/2013 | Gordon | |
| 8,480,067 | B2 * | 7/2013 | Furlow | B23Q 16/001 269/74 |
| 8,523,160 | B2 | 9/2013 | Wilturner | |
| D718,355 | S | 11/2014 | Muramatsu | |
| 9,682,454 | B2 * | 6/2017 | Suhling | B23Q 16/028 |
| 9,901,999 | B2 * | 2/2018 | Lin | B23D 55/04 |
| 10,442,058 | B2 * | 10/2019 | Wang | B25B 5/102 |
| 10,843,368 | B2 | 11/2020 | Friedebach | |
| 11,345,057 | B1 | 5/2022 | Duxbury | |
| 11,383,336 | B2 * | 7/2022 | Suhling | B27B 27/10 |
| 11,602,873 | B2 * | 3/2023 | Merrill | B28D 7/04 |
| 2003/0056631 | A1 * | 3/2003 | Duginske | B27F 5/02 83/468.7 |
| 2004/0060404 | A1 * | 4/2004 | Metzger, Jr. | B27B 5/32 83/835 |
| 2007/0022856 | A1 * | 2/2007 | Paine | B43L 7/10 83/522.11 |
| 2007/0095184 | A1 * | 5/2007 | Chuang | B27B 27/10 83/438 |
| 2011/0214541 | A1 * | 9/2011 | Rybka | B26D 7/01 83/13 |
| 2015/0298273 | A1 * | 10/2015 | Suhling | B23Q 16/08 269/74 |
| 2018/0036867 | A1 * | 2/2018 | Wang | B25B 5/006 |
| 2019/0381614 | A1 * | 12/2019 | Suhling | B23Q 3/007 |
| 2020/0215623 | A1 | 7/2020 | Duginske | |
| 2021/0394319 | A1 * | 12/2021 | Suhling | B27B 27/10 |
| 2022/0241913 | A1 | 8/2022 | Skillicorn | |
| 2023/0073793 | A1 | 3/2023 | Duxbury | |
| 2023/0234257 | A1 | 7/2023 | Sherman | |

OTHER PUBLICATIONS

"Woodworking Guide Positioner", Aug. 15, 2020, Amazon.com, site visited Aug. 12, 2023; https:WWW.amazon.com/dp/B08FYJGMF1 (Year 2020).

A Miter Gauge that Does One Angle—Woodpeckers Exact-90 Review, Feb. 25, 2022, YouTube.com, site visited Aug. 12, 2023: https://www.youtube.com/watch?v=JGFfAe9qk7A (Year 2022).

* cited by examiner

METHOD AND APPARATUS FOR USING A MITER GAUGE

BACKGROUND

Woodworking is a skill of making items from wood, including cabinetry, woodcarving, joinery, carpentry, wood-turning, and the like. In utilizing such skills, various tools are employed including power tools and table tools such as miter tables, router tables, table saws, and the like. As these devices are used for cutting or otherwise shaping pieces of wood, they tend to involve many sharp and moving parts; therefore, it is common when utilizing such table tools, to take advantage of numerous guards, gauges, and the like.

Modern workstations and work surfaces are often constructed to provide for use of such additional items. For example, table saws typically include a miter slot and a miter gauge provided with the saw at the time of purchase. The slot formed in the tabletop or work surface may allow the miter gauge to slide therein to provide safe material handling while additionally allowing for proper alignment of the material being cut to ensure uniform cuts, the most common of which being a perfectly square, 90-degree cut.

While the saws and tables themselves are often highly engineered, it is often the case that standard equipment miter gauges are a secondary consideration, and are often only included with saw purchases as a value-added benefit. Accordingly, it is all too common to find that a miter gauge included with a new table saw purchase is of lower quality and/or usability and is thus often replaced with aftermarket miter gauges. In other instances, miter gauges are not included with a purchase, and thus aftermarket gauges are sought out for purchase.

One issue raised by the existence of multiple aftermarket miter gauges is that to provide wide adaptability, there exists an engineering assumption that all miter slots across multiple brands, price points, and sizes of table saws are straight and uniform; however, this is not typically the case. This is further exacerbated by the fact that repeated use of a miter slot can, over time, cause the slot to wear unevenly and may therefore cause an additional element of non-uniformity in the miter slot. Accordingly, aftermarket miter gauges often do not have a tight fit within the miter slot.

This may cause issues with uneven cuts but may further cause unwanted rotation of the miter gauge when not supported by the full width of the saw top or work surface. In particular, when a larger piece of material is being cut by the table saw it is common that the miter gauge may operably be engaged with the miter slot while the main body of the miter gauge may extend past an edge of the work surface. This can cause the miter gauge to rotate relative to the work surface and to the piece of material, which may ultimately result in uneven cuts and/or additional hazard to an operator as they make a cut to a piece of material and simultaneously divert their attention to keeping the miter gauge level while it is off the edge of the work surface.

SUMMARY

The present disclosure addresses these and other issues by providing a rotation stop assembly that is operable to engage a rail assembly of a miter gauge to support the miter gauge and prevent rotational movement thereof when the gauge is extended beyond the edge of a work surface. The rotation stop assembly may utilize the piece of material being cut to further support the gauge and prevent rotational movement thereof.

In one aspect, an exemplary embodiment of the present disclosure may provide a rotation stop assembly comprising: a body having a top and a bottom; at least one aperture defined through the body between the top and bottom thereof; a screw assembly operable to secure the body of the rotation stop assembly to a rail assembly of an associated tool; and a stop bar disposed within the at least one aperture of the body and moveable relative thereto; wherein the stop bar is operable to engage a top surface of a piece of material to support the rail assembly and prevent the rotational movement of the rail assembly relative to the piece of material.

In another aspect, an exemplary embodiment of the present disclosure may provide a method comprising: abutting a piece of material against a rail assembly of an associated tool; securing a rotation stop assembly to the rail assembly with a screw assembly; lowering a stop bar of the rotation stop assembly until an end thereof contacts a top surface of the piece of material; and supporting the rail assembly with the stop bar through the engagement of the end of the stop bar and the top surface of the piece of material to prevent rotational movement of the rail assembly relative to the piece of material.

In another aspect, and exemplary embodiment of the present disclosure may provide a method of cutting a piece of material comprising: placing a piece of material on top of a work surface of a cutting tool with a first edge of the piece of material extending beyond an edge of the work surface; abutting the first edge of the piece of material against a rail assembly of an associated miter gauge; securing a rotation stop assembly to the rail assembly with a screw assembly; lowering a stop bar of the rotation stop assembly until an end thereof contacts the top surface of the piece of material; supporting the rail assembly with the stop bar through the engagement of the end of the stop bar and the top surface of the piece of material to prevent rotational movement of the rail assembly relative to the piece of material; and moving the piece of material across the work surface to cut the piece of material with the cutting tool.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
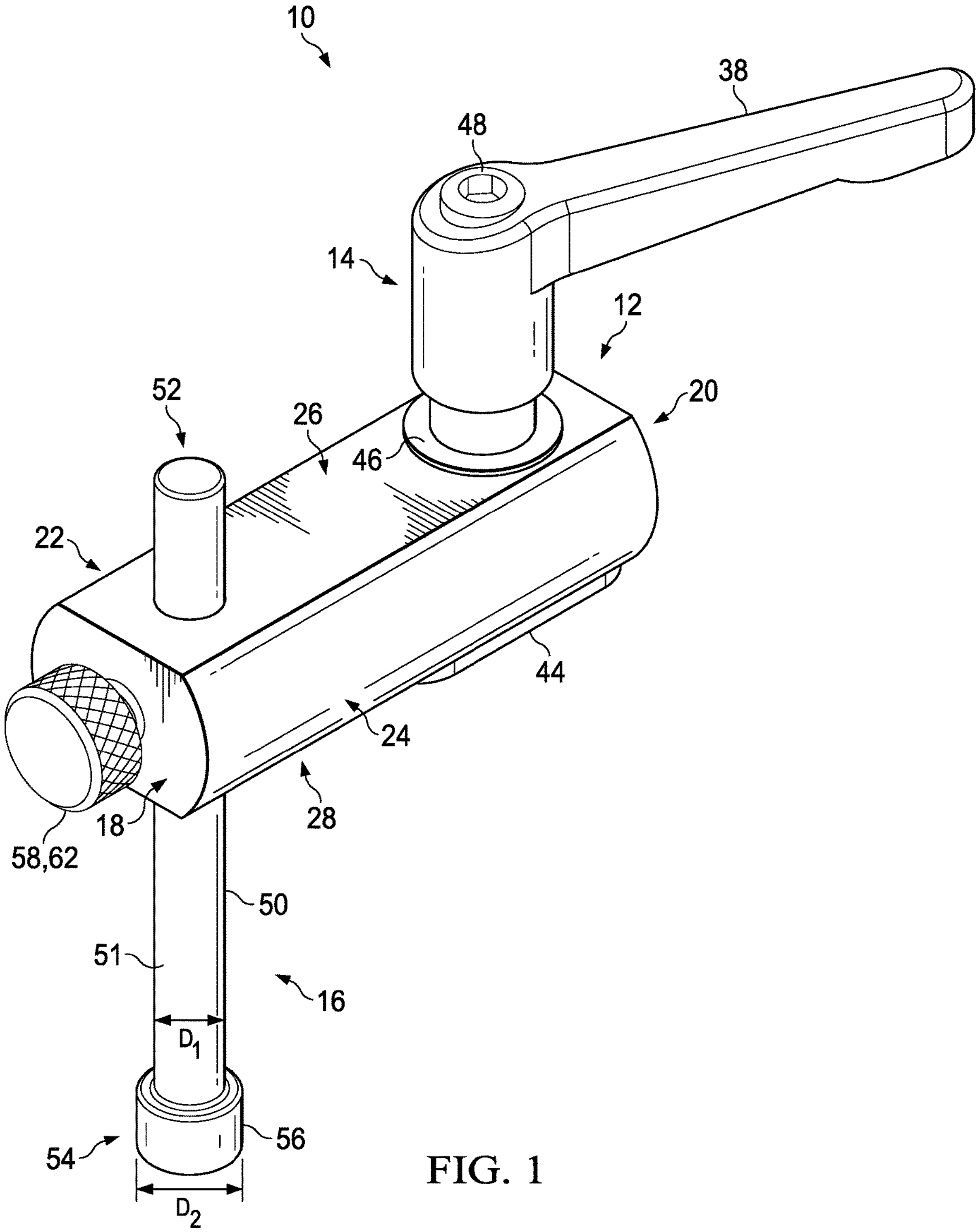
FIG. 1 (FIG. 1) is a top perspective isometric view of a rotation stop assembly according to one aspect of the present disclosure.
Figure 2:
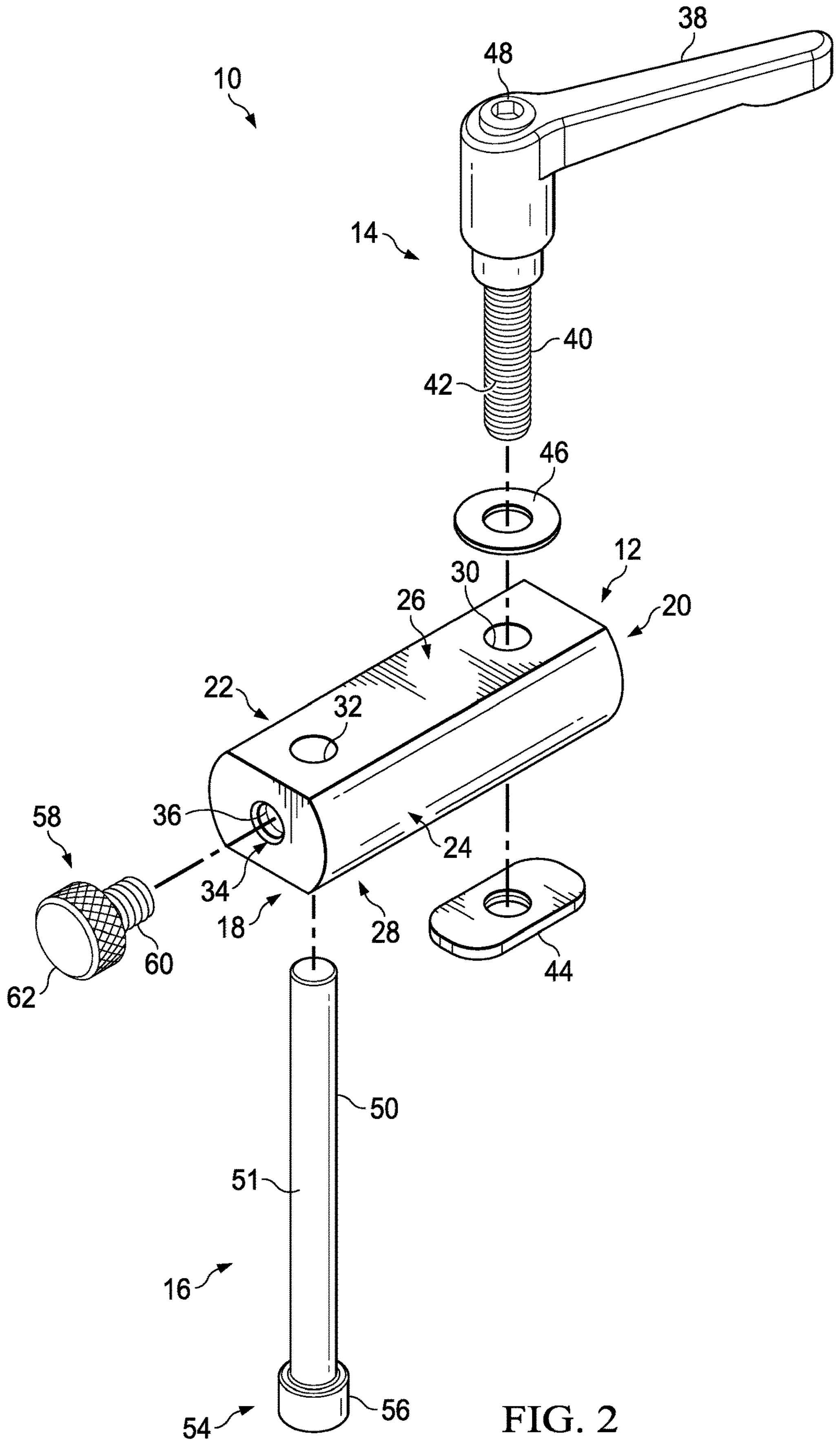
FIG. 2 (FIG. 2) is a top perspective isometric exploded view of a rotation stop assembly according to one aspect of the present disclosure.

With reference to FIGS. 1 and 2, a rotation stop assembly is shown and generally indicated at reference 10. Rotation stop assembly 10, or simply stop assembly 10, may include a body 12, a rail screw assembly 14, and a stop assembly 16.

Body 12 may have a first end 18 spaced apart from a second end 20 and defining a longitudinal direction therebetween. Body 12 may have a first side 22 spaced apart from a second side 24 and defining a transverse direction therebetween, and a top 26 spaced apart from a bottom 28 and defining a vertical direction therebetween. Body 12 may further include a plurality of apertures defined therein. In particular, body 12 may include a rail screw aperture 30 and a stop bar aperture 32, both of which may be defined through the body 12 extending through the top surface 26 and through the bottom surface 28 in the vertical direction. These apertures will be discussed more below in relation to the associated components.

Body 12 may further include a thumbscrew aperture 34 defined in the first end 18 thereof for operable engagement with thumbscrew 58, as discussed further below. Thumbscrew aperture 34 may include internal threading or threads 36. Thumbscrew aperture 34 may be in communication with stop bar aperture 32 such that thumbscrew 58 may interact with stop bar 50 as discussed further below.

Body 12 may be elongated in the longitudinal direction between first and second ends 18 and 20 to provide clearance over a rail assembly, such as rail assembly 64, discussed herein. Accordingly, body 12 may be sized according to the specific implementation and may be scaled for use with multiple-sized and/or configured rail assembly 64 and/or miter gauges.

Body 12 may be constructed of any suitable material and may be formed of a single solitary piece or may be formed of more than one element operably engaged together to form body 12. According to one aspect, body 12 may be machined from a single billet of aluminum, steel, or other similar metal materials.

As shown herein, first and second sides 22 and 24 of body 12 may be convex to provide additional support material alongside apertures 30 and 32 for additional structural rigidity to body 12. According to another aspect, first and second sides 22 and 24 may be generally convex for aesthetic reasons and may have any suitable or desired profile as dictated by the desired implementation.

Rail screw assembly 14 may include a handle 38 operably engaged with a shaft 40, for engagement with a rail assembly, such as rail assembly 64, as discussed below. Shaft 40 may be externally threaded and have a plurality of threads 42 provided thereon for operable engagement with a rail nut 44 as described further below. Rail screw assembly 14 may further include a washer 46 or other similar component disposed between handle 38 and body 12 of stop assembly 10 as discussed further herein. According to one aspect, as shown, handle 38 may be operably connected to shaft 40 by a handle screw 48 which may allow for removable engagement of handle 38 and shaft 40 as discussed further below.

Handle 38 may be any suitable handle type, size, and/or shape operable to rotate shaft 40. According to one aspect, handle 38 may be an extended handle, as shown in the figures, which may facilitate rotational operation utilizing one hand. According to another aspect, handle 38 may have any suitable shape or configuration including t-shaped handles, wing-shaped handles, or any other suitable profile. Handle 38 may be constructed of any suitable material and may be permanently affixed to shaft 40 or removably attached thereto as discussed herein. According to one aspect, handle 38 may be removably attached to shaft 40 via handle screw 48 which may allow for replacement of handle 38 in the event of damage, wear, or in the event that a different handle profile or style is preferred, thus allowing handle 38 to be swapped out therewith.

Shaft 40 may be a standard threaded shaft which may interact with rail nut 44 such that the rotation of handle 38 may cause threads 42 to engage with rail nut 44 to move rail nut 44 towards body 12 to secure rotation stop assembly 10 to a rail assembly 64, as discussed further below.

Rail nut 44 may be an elongated plate, nut, or the like having a threaded aperture defined therethrough for interaction with shaft 40 and threads 42 of rail screw assembly 14. According to another aspect, rail nut 44 may be substantially thin enough as to allow the entirety of rail nut 44 to rotate about threads 42 for operable engagement therewith. According to another aspect, rail nut 44 may be any suitable nut or similar fastener operable to interact with threads 42 to secure stop assembly 10 to another structure.

It will be understood, that rail screw assembly 14, including handle 38, shaft 40, and rail nut 44 may be modified to permit use of stop assembly 10 with any suitable size, shape, profile, or configuration of rails and/or rail assemblies, including those used with miter gauges and other similar tools. Similarly, rail screw assembly 14 may be scaled for use with other sized gauges and the like.

Stop bar assembly 16 may generally include two components, namely, stop bar 50 and thumbscrew 58. Stop bar 50 may have a body 51 with a first end 52 spaced apart from a second end 54 and defining the vertical height of stop bar 50. The first and second ends 52 and 54 may further define the maximum limits of adjustability of rotation stop assembly 10, as discussed further below. Stop bar body 51 may generally be cylindrical and may include a head 56 at the second end 54 thereof.

According to one aspect, stop bar 50 may be a solid metal cylinder machined or otherwise formed from a single piece of material including metals, plastic, polymers or the like. Head 56 may be larger than the body 51 in that stop bar body 51 may have a first diameter (shown in FIG. 1 as diameter D1) while head 56 may have a second diameter (shown in FIG. 1 as diameter D2) that is larger than diameter D1. This extended diameter D2 of head 56 may prevent stop bar 50 from passing fully through stop aperture 32 defined in body 12 and may further provide a larger surface area for supporting a miter gauge on a piece of material, as discussed further below. Additionally, for storage purposes, head 56 may allow stop assembly 10 to be stored without requiring thumbscrew 58 to be fully engaged with stop bar 50, as discussed below.

Thumbscrew 58 may be a standard thumbscrew having a threaded portion 60 with external threads operable to engage threads 36 within thumbscrew aperture 34 and a head 62, which may have or include a textured surface to allow the normal and expected operation thereof. As mentioned above, thumbscrew 58 may extend through thumbscrew aperture 34 and into stop bar aperture 32 to allow operational engagement between the threaded portion 60 and the body 51 of stop bar 50 to secure stop bar 50 in position within stop bar aperture 32.

As with rail screw assembly 14, stop bar assembly 16, including both stop bar 50 and thumbscrew 51, may be modified to permit use of stop assembly 10 with any suitable size, shape, profile, or configuration of rails and/or rail assemblies, including those used with miter gauges and other similar tools. Similarly, stop bar assembly 16 may be scaled for use with other sized gauges and the like.

Figure 3:
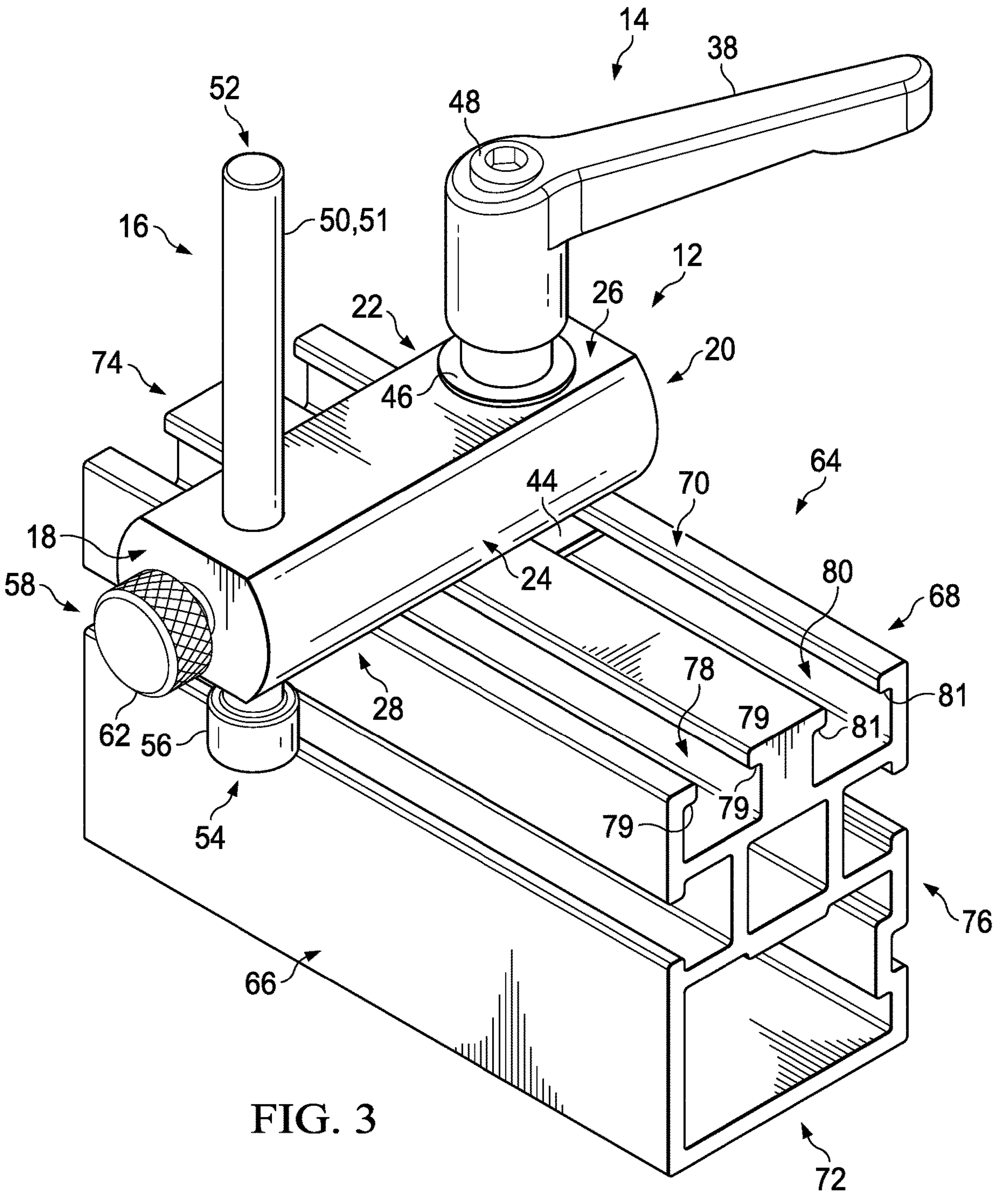
FIG. 3 (FIG. 3) is a top isometric perspective view of a rotation stop assembly installed on a rail assembly according to one aspect of the present disclosure.

With reference to FIG. 3, as discussed previously herein, stop assembly 10 may be utilized with a rail or rail assembly 64. Rail assembly 64 may generally be a portion of, or may be operationally connected to, a miter gauge for use with a table saw as discussed further herein. Rail assembly 64 may have a front side 66 and a back side 68 spaced longitudinally therefrom, a top 70 spaced vertically from a bottom 72, and a first end 74 spaced transversely apart from a second end 76. Rail assembly 64 may further include at least one slot for operational engagement with various components, elements, and/or accessories for use with a miter gauge. As is relevant to the stop assembly 10 described herein, rail assembly 64 may include a first slot 78 and a second slot 80 defined in the top 70 thereof. Additional slots may be provided and/or utilized; however, for simplicity and clarity in the disclosure, only first and second slots 78 and 80 will be discussed.

Rail assembly 64 may be a part of a miter gauge and may be integrally formed with the miter gauge or may be formed separately and operationally connected thereto. Rail assembly 64 may be formed of any suitable material including aluminum or other metals, plastics, polymers, or the like and may be formed using any suitable manufacturing method. Although shown in the figures and described herein, in a specific configuration rail assembly 64 may be any commercially available rail or rail assembly utilized with a miter gauge and it will be further understood that stop assembly 10 may be readily scaled or adapted for use with other rails or rail assemblies, as desired.

Stop assembly 10 may engage with one of first or second slots 78 or 80 in rail assembly 64 utilizing the rail screw assembly 14. In particular, first and second slots 78 and 80 may provide a flange or shelf 79 and 81, respectively, which may provide that the opening into first and second slots 78 and 80 is smaller than rail nut 44. In particular, first slot 78 may include a lip or flange 79 which may provide the interaction point between rail assembly 64 and rail nut 44 when stop assembly 10 is engaged with the first slot 78. Similarly, second slot 80 may also have a lip or flange 81 which may provide the interaction point between rail assembly 64 and rail nut 44 when stop assembly 10 is engaged with the second slot 80.

Thus, rail nut 44 may be inserted into first or second slot 78 or 80 from first or second end 74 or 76 of rail assembly 64 and handle 38 of rail screw assembly 14 may be rotated to tighten the rail nut 44 against the slot flange 79 and/or 81, depending upon the slot 78 or 80 with which the rail stop assembly 10 is engaged. First and second slots 78 and 80 may be spaced apart from each other to provide adjustability and positioning variance for rotation stop assembly 10 amongst other accessories, as dictated by the desired implementation. The use of first and second slots 78 and 80 will be understood to be substantially identical but for the specific location and/or placement of stop assembly 10 on rail assembly 64.

Figure 4A:
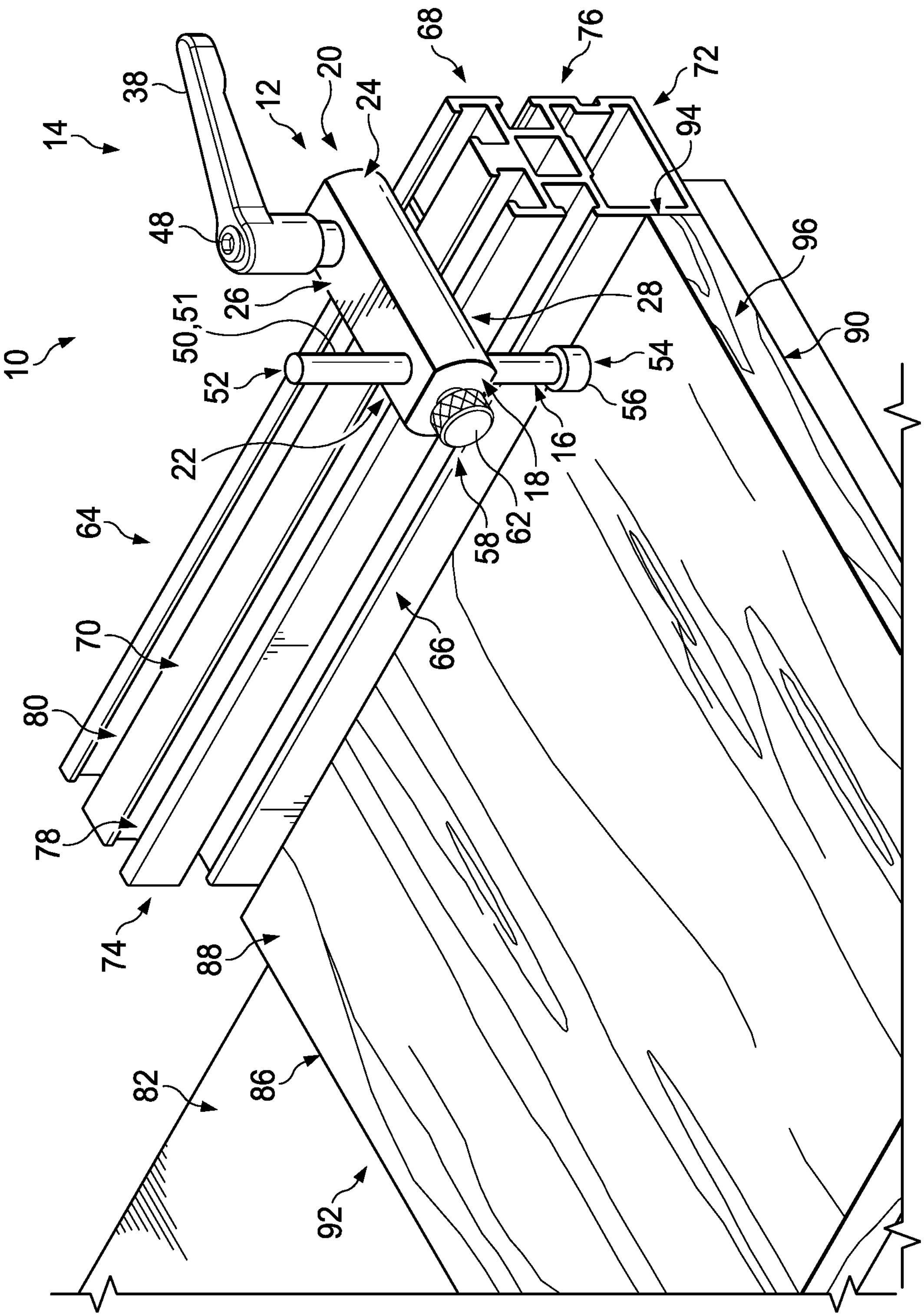
FIG. 4A (FIG. 4A) is a top perspective isometric operational view of a rotation stop assembly and rail assembly according to one aspect of the present disclosure.
Figure 4B:
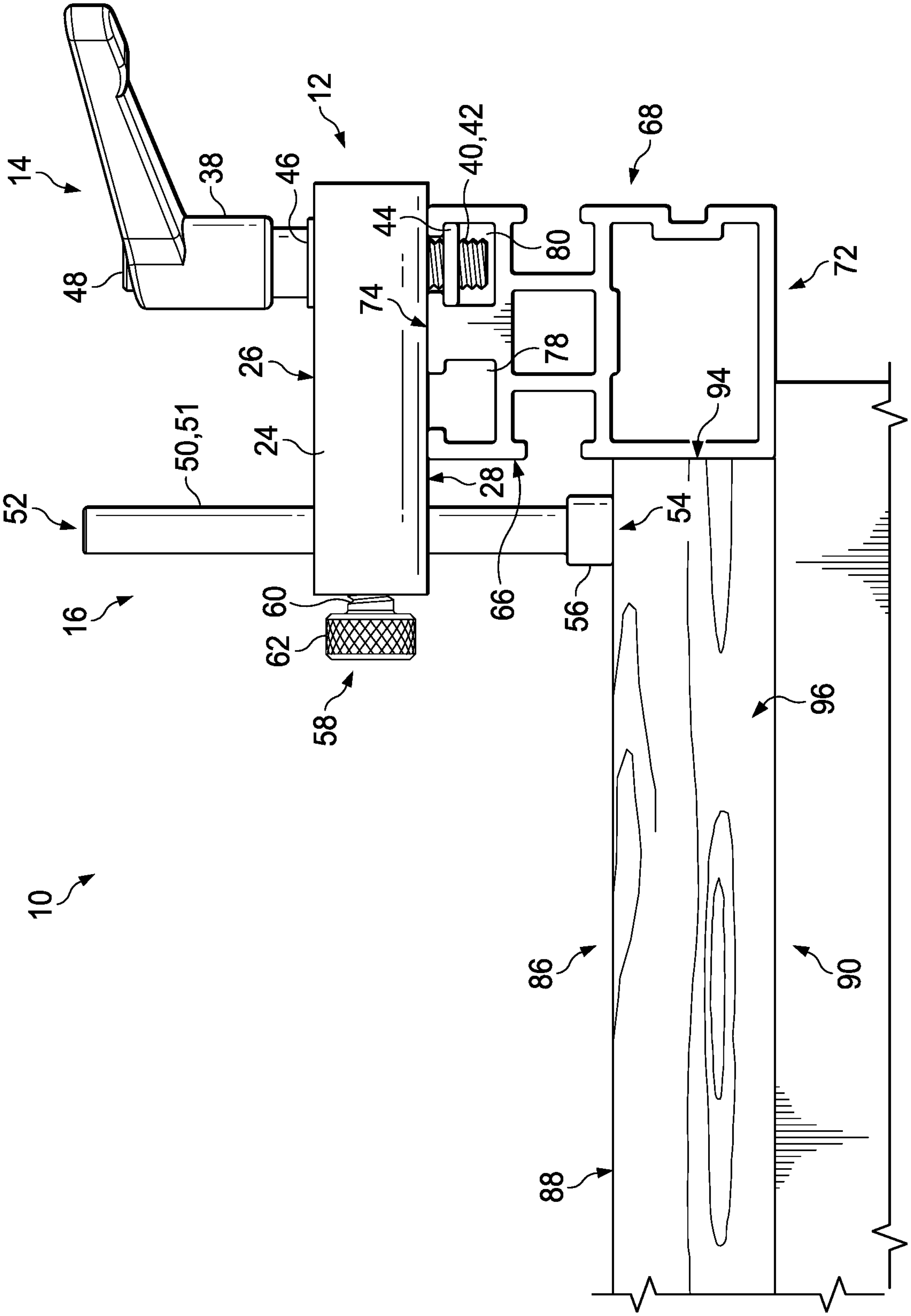
FIG. 4B (FIG. 4B) is a side elevation operational view of a rotation stop assembly and rail assembly according to one aspect of the present disclosure.

With reference now to FIGS. 4A and 4B, and as mentioned previously herein, rotation stop assembly 10 may be utilized with a piece of material such as work piece or board 86 to prevent rotational movement of a miter gauge and of rail assembly 64 relative thereto when the board extends past an edge of a work surface 82. In particular, rail assembly 64 may interact with an edge (such as edge 94) of board 86 while stop bar assembly 16, or more particularly, head 56 of stop bar 50, may interact with a top surface 88 of board 86 to prevent rotational movement as discussed further below. Rotation stop assembly 10 may be installed in any suitable position relative to board 86 to provide the anti-rotational force, as discussed further herein.

As used herein, the piece of material is shown as a board 86 being cut by a table saw blade 85. It will be understood that although described herein as a board 86, the piece of material may be any suitable material and the associated tool may be any suitable tool, such as table saws, band saws, rip saw, miter saws, miter tables, or the like.

Board 86 may have a top surface 88 and a bottom surface 90 defining the thickness of the board therebetween. Board 86 may further include a continuous sidewall or side edge defining the outer dimensions of board 86. According to one example, as shown and described herein, board 86 may be generally square or rectangular and may have a first side edge 92, second side edge 94, third side edge 96, and fourth side edge 98. The naming convention for side edges 92 through 98 may be general and may be used for clarity herein but will not be understood to limit which side is which. Similarly, top 88 may be defined by whichever side of board 86 faces upwards at the time of use and is not to be understood as a limitation thereof.

With continued reference to FIGS. 4A and 4B but with particular reference to FIG. 4B, the positional relationships between board 86, rail assembly 64, and stop assembly 10 will now be described in more detail. In particular, board 86 may be mostly or completely supported by work surface 82, which may be a top surface of a table saw or similar table woodworking tool. For clarity's sake, rail assembly 64 may similarly be partially or fully supported by work surface 82 as illustrated in FIGS. 4A and 4B. This support of rail assembly 64 by work surface 82 may prevent rotational movement of rail assembly 64 and/or an associated miter gauge when board 86 does not extend past the edge of the work surface 82.

When engaged with rail assembly 64, stop assembly 10 may be adjusted laterally along rail assembly 64 to position it in the best and most supportive position relative to board 86. Once properly positioned, stop assembly 10 may be secured in position on rail assembly 64 by tightening rail screw assembly 14 using handle 38, as described previously herein.

Once stop assembly 10 is secured in position on rail assembly 64, stop bar assembly 16 may be adjusted to move stop bar 50 vertically within stop bar aperture 32 until head 56 of stop bar 50 is engaged or otherwise in contact with top surface 88 of board 86. At this point, thumbscrew 58 may be tightened to secure stop bar 50 in that position and prevent vertical movement thereof. In this position, stop assembly 10 is considered fully engaged and operational and may be utilized to prevent rotation of rail assembly 64 and an associated miter gauge as described further below.

Having thus described the elements and components of stop assembly 10, the operation and use thereof will now be discussed.

Figure 5A:
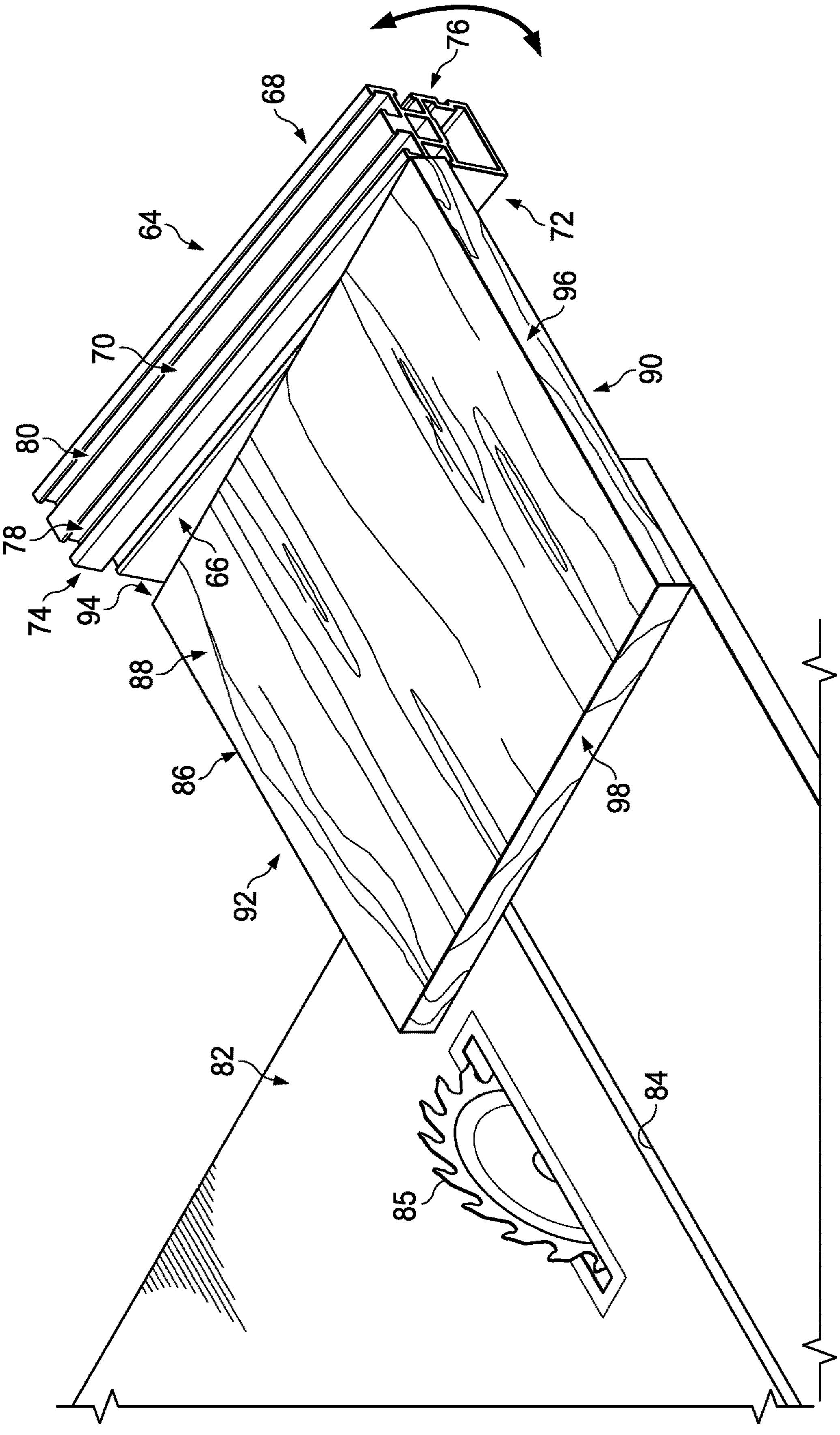
FIG. 5A (FIG. 5A) is a top perspective isometric operational view of a rotation stop assembly and rail assembly according to one aspect of the present disclosure.
Figure 5B:
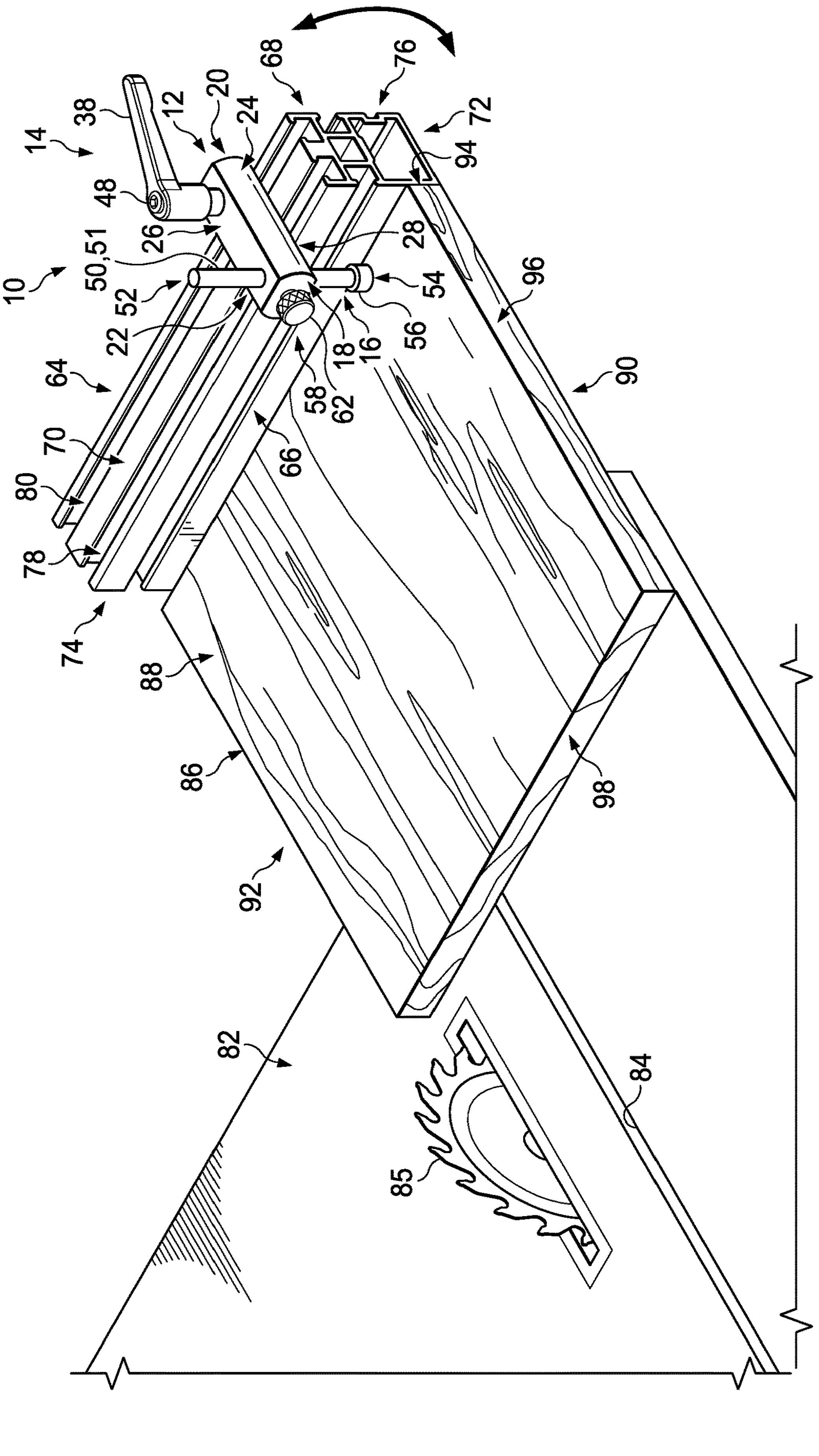
FIG. 5B (FIG. 5B) is a top perspective isometric operational view of a rotation stop assembly and rail assembly according to one aspect of the present disclosure.
Figure 6:
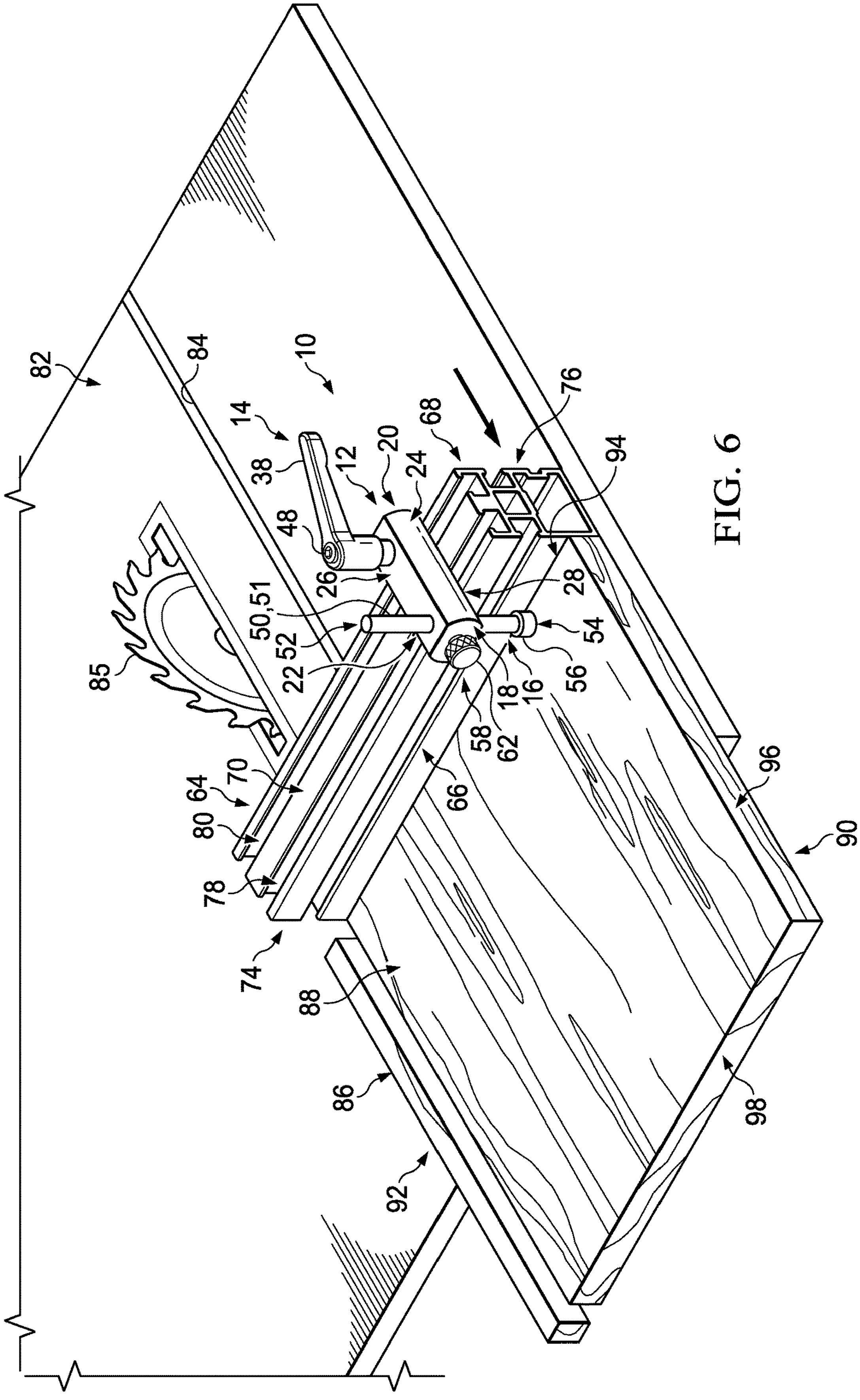
FIG. 6 (FIG. 6) is a top perspective isometric operational view of a rotation stop assembly and rail assembly according to one aspect of the present disclosure.

With reference to FIGS. 5A-6, but with particular reference to FIGS. 5A and 5B, the operation and use of rotation stop assembly 10 will now be discussed. As shown in FIG. 5A, rail assembly 64, which again is contemplated as part of a larger miter gauge or similar assembly, may rotate as indicated by the arrow in FIG. 5A. This rotation is particularly pronounced when rail assembly 64 is not supported by the work surface 82. Accordingly, this rotation may cause uneven cuts when cutting board 86 or another similar piece of material utilizing a table saw or the like. For example, this rotation of rail assembly 64 may cause 90-degree square cuts to be slightly out of line or otherwise angled to a degree more or less than 90 degrees. The rotation of rail assembly 64 and an associated miter gauge may further introduce additional hazards to the operator as the rotation of rail assembly 64 may cause an operator to divert their attention away from the cutting blade 85 and to the rotation, leading to a higher risk of injury or accident. In addition, when working with a piece of material that extends beyond the edge of the work surface 82, rotation of the rail assembly 64 may thwart the ability to completely cut board 86 in a single pass. In particular, when moving board 86 across work surface 82, a rotated rail assembly 64 will strike the edge of the work surface 82 and prevent further movement of the gauge and board 86, thus causing an incomplete cut, or alternatively, a delay in cutting that may introduce additional errors and/or hazards into the cutting process.

Accordingly, the use of rotation stop assembly 10 may allow the rigidity of board 86 to further support the rail assembly 64 to keep or otherwise proper alignment thereof relative to the work surface 82. In particular, rotation stop assembly 10 may allow for the bottom surface or bottom 72 of rail assembly 64 to be aligned with the bottom 90 of board 86 for a smooth transition onto and across work surface 82.

Accordingly, to engage rotation stop assembly 10 to support rail assembly 64, as mentioned herein, first the rail assembly 64 may be placed adjacent the board 86 with the front 66 of rail assembly 64 abutting at least one of first, second, third, or fourth side edges 92 through 98 of board 86. As shown herein, rail assembly 64, or more particularly, front surface 66 thereof, is adjacent to and abutting second side edge 94 of board 86.

Next, rotation stop assembly 10 may be inserted into rail assembly 64 utilizing rail screw assembly 14 with one of first or second slots 78 and 80. Once inserted into first or second slot 78 or 80, rail screw assembly 14 may be tightened using handle 38 to engage rail nut 44 with slot flange 79 or 81 depending upon which slot 79 or 80 is used. As shown in FIGS. 5B and 6, rail screw assembly 14 is engaged with second slot 80; therefore, rail nut 44 will be engaged with second slot flange 81. Once installed within second slot 80, stop assembly 10 may be moved into the position wherein rail assembly 64 is best supported by the board 86. This position may be determined by the length or overall size of board 86 and may vary depending upon the size and distance board 86 extends beyond an edge of work surface 82. Generally speaking, this position will be closer to the far edge of the board 86 away from the miter slot 84 in the work surface 82 and/or away from a body of an associated gauge, close to where the degree of rotation of the rail assembly 64 is the highest.

Once properly aligned and tightened into place, thumbscrew 58 may be loosened to allow stop bar 50 to move vertically within stop bar aperture 32 until head 56 of stop bar 50 contacts the top surface 88 of board 86. Once head 56 is in place on top surface 88 of board 86, thumbscrew 58 may be tightened to lock stop bar 50 into position within stop bar aperture 32. At this point, the rigidity of board 86 supports the rail assembly 64 and prevents the rotational movement thereof. The proper positioning for stop bar 50 may again be determined by aligning the bottom surface 72 of rail assembly 64 with the bottom surface 90 of board 86 such that these two bottom surfaces may be considered coplanar. Stop bar 50 may be secured with rail assembly in this position 64 as described previously herein.

With continued reference to FIGS. 5A-6, but particular reference to FIG. 6, with stop assembly 10 properly installed on rail assembly 64 the board 86 and rail assembly 64 may be moved across the work surface 82 allowing the saw blade 85 to make a cut on board 86 as desired and as shown in FIG. 6. The specific location and type of cut may vary depending upon the desired usage; however, the inclusion of stop assembly 10 preventing any rotational movement of rail assembly 64 may ensure a smooth transition onto work surface 82 as the miter gauge, including rail assembly 64, is moved to perform the cutting action on board 86. Stop assembly 10 may further facilitate consistent and uniform cuts to board 86 by locking rail assembly 64 and therefore any associated miter gauge in position while simultaneously reducing the risk of injury as the operator's attention may be properly focused on making the cut and not on attempting to manually prevent rotation of rail assembly 64.

Although described and discussed predominantly for use with miter gauges and table saws, it will again be understood that rotation stop assembly 10 may be readily adapted for use with other tools and/or gauges and may be utilized or adapted for use with other rail assembly configurations including commercially available rails or the like. It will be further understood that the examples provided herein are non-limiting examples and stop assembly 10 may be modified for other uses, as dictated by the desired implementation.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A rotation stop system comprising:

a rail assembly operatively coupled with a table saw, wherein the rail assembly includes a flange defining an opening to at least one slot formed in the rail assembly, wherein the rail assembly includes a first wall opposite a second wall and a lower wall extending between the first wall and the second wall that collectively define a U-shaped configuration, wherein the first wall, the second wall, and the lower wall define the at least one slot;

a rotation stop assembly body having a top and a bottom;

a first aperture defined through the rotation stop assembly body and extending between the top and bottom thereof;

a second aperture defined through the rotation stop assembly body and extending between the top and bottom thereof, the second aperture being parallel to the first aperture;

a rail nut sized to fit within the at least one slot defined in the rail assembly, wherein the opening to the at least one slot is smaller than the rail nut, wherein the rail nut contacts the flange to define an interaction point between the rail assembly and the rail nut;

a screw assembly extending through the first aperture, the screw assembly operable with the rail nut to secure the rotation stop assembly body to the rail assembly of an associated tool; and a stop bar disposed within the second aperture of the rotation stop assembly body and moveable relative thereto;

wherein the stop bar is operable to engage a top surface of a piece of material to support the rail assembly and prevent the rotational movement of the rail assembly relative to the piece of material, wherein the lower wall of the rail assembly is spaced apart and above a bottom surface of the piece of material.

2. The rotation stop system of claim 1 further comprising:

a thumbscrew aperture defined in a front surface of the rotation stop assembly body and in communication with the second aperture defined through the top and bottom of the rotation stop assembly body; and a thumbscrew operably engaged within the thumbscrew aperture to selectively secure the stop bar in position relative to the rotation stop assembly body.

3. The rotation stop system of claim 2, wherein the thumbscrew aperture is threaded.

4. The rotation stop system of claim 2 wherein the stop bar further comprises:

a body extending through the second aperture defined through the top and bottom of the rotation stop assembly body having a first diameter; and a head defining an end of the body that engages the top surface of the piece of material, the head having a second diameter that is greater than the first diameter;

wherein the head prevents the stop bar from being removed from the second aperture defined through the top and bottom of the rotation stop assembly body in one direction.

5. The rotation stop system of claim 1 wherein the at least one slot is operable to engage the screw assembly;

wherein the rotation stop assembly body is slidable relative to the rail assembly within the at least one slot.

6. The rotation stop system of claim 5 wherein the screw assembly further comprises:

a handle;

a threaded shaft; and wherein the rail nut operable to engage the threaded shaft to secure the screw assembly within the at least one slot defined in the rail assembly.

7. The rotation stop system of claim 6 wherein the handle of the screw assembly is operated with a single hand.

8. The rotation stop system of claim 6, wherein the handle is removably attached to the threaded shaft.

9. The rotation stop system of claim 8, further comprising:

a handle screw that removably attaches the handle to the threaded shaft.

10. The rotation stop system of claim 6, wherein the handle is an elongated handle.

11. The rotation stop system of claim 6, wherein the rail nut is substantially thin enough as to allow the entirety of rail nut to rotate about threads on the threaded shaft.

12. The rotation stop system of claim 5 wherein rail assembly further comprises:

a bottom surface that is coplanar with a bottom surface of the piece of material when the rail assembly is supported by the stop bar engaged with the top surface of the piece of material.

13. The rotation stop system of claim 1, wherein the rail nut is an elongated plate defining a threaded aperture.

14. The rotation stop system of claim 1, wherein the rail nut is below the bottom of the rotation stop assembly body.

15. The rotation stop system of claim 1, wherein the rotation stop assembly further comprises:

a first side and a second side, wherein the first and second sides are convex.

* * * * *